(12) United States Patent
Eenkhoorn (10) Patent No.: US 9,533,826 B2
(45) Date of Patent: Jan. 3, 2017

(54) ELEMENT FOR ELIMINATING TURBULENT BEHAVIOR OF LIQUID IN A HOLDER

(71) Applicant: ACCEDE B.V., Hengelo (NL)

(72) Inventor: Erik Jeroen Eenkhoorn, Hengelo (NL)

(73) Assignee: ACCEDE B.V., Hengelo (NL)

( * ) Notice: Subject to any disclaimer, the term of this patent is extended or adjusted under 35 U.S.C. 154(b) by 0 days.

(21) Appl. No.: 14/351,339

(22) PCT Filed: Oct. 12, 2012

(86) PCT No.: PCT/NL2012/000062
§ 371 (c)(1),
(2) Date: Apr. 11, 2014

(87) PCT Pub. No.: WO2013/062403
PCT Pub. Date: May 2, 2013

(65) Prior Publication Data
US 2014/0246446 A1   Sep. 4, 2014

(30) Foreign Application Priority Data
Oct. 12, 2011   (NL) ..................... 1039103

(51) Int. Cl.
*B65D 88/12*   (2006.01)
*B65D 90/52*   (2006.01)
*B60P 3/22*   (2006.01)

(52) U.S. Cl.
CPC ............. *B65D 90/52* (2013.01); *B60P 3/2235* (2013.01); *B60P 3/2295* (2013.01)

(58) Field of Classification Search
CPC ........ B65D 90/52; B60P 3/2235; B60P 3/2295
(Continued)

(56) References Cited

U.S. PATENT DOCUMENTS 3,144,953 A   8/1964   Taylor ........................... 220/530
3,209,680 A *   10/1965   McGinnis ..................... 100/211
(Continued)

FOREIGN PATENT DOCUMENTS

DE   197 44 359 A1   6/1998
WO   WO 2007/081201   7/2007
(Continued)

OTHER PUBLICATIONS

Search Report and Written Opinion in International Application No. PCT/NL2012/000062 mailed Apr. 24, 2013.
(Continued)

*Primary Examiner* — J. Gregory Pickett
*Assistant Examiner* — Niki M Eloshway
(74) *Attorney, Agent, or Firm* — Norton Rose Fulbright US LLP (57) ABSTRACT

The present invention relates to essential details of the design of an inflatable element (5), which can neither be moved nor deformed by the liquid (3), to its functional operation, and to the resulting predictable and repeatable ability to eliminate turbulent behavior and to influence the behavior of a liquid in a holder (2) or tank suitable for the storage or transport of liquids, in which the element at any liquid level and at any volume of liquid at least completely covers the horizontal liquid surface and in which the element can change both in size and in shape if required necessary by the geometry, the shape or the dimensions of the liquid holder or tank.

5 Claims, 9 Drawing Sheets

(58) Field of Classification Search
USPC .................................. 220/720, 563, 216, 734
See application file for complete search history.

(56) References Cited

U.S. PATENT DOCUMENTS

| | | | | |
|---|---|---|---|---|
| 3,733,005 | A * | 5/1973 | Frieder, Jr. .................... | 220/720 |
| 4,347,798 | A * | 9/1982 | Gallagher .................... | 114/74 R |
| 6,032,347 | A * | 3/2000 | Behr et al. .................... | 29/419.1 |
| 6,966,401 | B2 * | 11/2005 | Kojima ........................ | 181/233 |
| 8,708,190 | B2 * | 4/2014 | Chun ........................... | 220/734 |
| 2007/0029335 | A1 * | 2/2007 | Johansson .................... | 220/720 |

FOREIGN PATENT DOCUMENTS

| | | |
|---|---|---|
| WO | WO 2010/104379 | 9/2010 |
| WO | WO 2012/070933 | 5/2012 |

OTHER PUBLICATIONS

International Preliminary Report on Patentability in International Application No. PCT/NL2012/000062 mailed Apr. 15, 2014.

* cited by examiner

ELEMENT FOR ELIMINATING TURBULENT BEHAVIOR OF LIQUID IN A HOLDER

This application is a national phase application under 35 U.S.C. §371 of International Application No. PCT/NL2012/000062 filed 12 Oct. 2012, which claims priority to Netherlands Patent Application No. 1039103 filed 12 Oct. 2011. The entire contents of each of the above-referenced disclosures is specifically incorporated herein by reference without disclaimer.

The present invention relates to essential details of the design of an element, which can neither be moved nor deformed by the liquid, to its functional operation, and to the resulting predictable and repeatable ability to eliminate turbulent behaviour and to influence the behaviour of a liquid in a holder or a tank suitable for storage or transport of liquids.

Normally the behaviour of liquids in holders, and in particular the turbulent movement of these liquids, is only predictable if this liquid is contained in a non-deformable, non-elastic, completely closed holder and fills this holder for 100%. The absence of air prevents that the liquid may become turbulent and that it may displace itself relative with respect to the tank walls. When such a 100%-filled holder is moving, accelerating or slowing down, then the liquid will move, accelerate or slow down identically with the holder. The contact between the interior wall of the holder and the liquid thereby ensures the necessary transfer of the forces involved when accelerating or decelerating.

The transfer of friction forces between the liquid and walls is, in addition to the surface roughness, inter alia dependent on the quality of the contact between the two. The quality of contact is directly related to the pressure they exert onto each other. The coefficient of friction varies from zero, when there is no contact and there is no mutual pressure exerted, up to a maximum value, which is dependent on the nature of the liquid and on the material of which the interior wall of the tank is made. A 100%-filled, non-deformable and non-elastic, tank should preferably have some (millibar) excess pressure in order to sufficiently ensure this contact between the wall and liquid and also to ensure that neither air nor evaporating components originating from the liquid left are behind in the tank during filling or are formed after filling. Due to a, usually slight, overpressure of the liquid is achieved both that neither air nor gas is present and can be formed in the 100% filled tank, and that the top plate of the closed tank is also functional in the transfer of forces from the tank onto the liquid and vice versa.

During accelerations or decelerations, in which the total of walls of the non-deformable and non-elastic 100% liquid filled tank can insufficiently transfer the forces onto the liquid (or vice versa), a pressure gradient in the liquid will arise in the direction of acceleration or deceleration. Thus, during braking or slowing down of the tank, the "head" plate or the front plate of the tank, as seen in the driving direction, will experience a higher pressure from the liquid than the rear plate, when the tank walls insufficiently transfer the braking force onto the liquid in order to obtain identical and simultaneous slowdown of liquid and the mobile holder. From the front to the rear, seen in the driving direction, a pressure drop arises in the liquid ensuring that the liquid and the holder simultaneously equally decelerate. Because of the incompressibility of liquids no displacement of liquid will occur at such a pressure gradient, usually less than 100 millibar per meter, and therefore there will be no liquid turbulence and also no stability problems.

In a rectangular "beam"-shaped tank that is 100% filled with liquid, the top plate is located exactly on what would be the liquid/air contact-surface in the absence of this top plate. A free liquid/air surface, in particular when bounded by walls in lateral directions, will always be unstable in dynamic situations because air has a much lower specific weight than liquid, and because air is much less resistant than water, in other words possesses a lower mass moment of inertia, against deformation. Because of the incompressibility of liquids any local pressure difference causes a displacement of the liquid, preferably in the direction of the least resistance, i.e. in the direction of a free air contact. When freely present, air displaces much faster than liquid and therefore firstly supplements a locally formed underpressure thereby causing turbulence. The steel upper plate of a beam-shaped 100% filled tank better eliminates this dynamic outbreak of liquids when the steel plate is more shape-retaining and less elastic. It is known that an elastic and deformable cover (cellophane) on a holder, such as a bucket, does not offer this resistance and thus will fail when locally occurring peak tensions or strains or energy transfers are higher than the material, from which the cover is made, can handle. The top plate of the tank should preferably be non-deformable and non-elastic, in order to prevent turbulent behaviour of the liquid.

In view of the desired, small, overpressure of the liquid in a 100% filled tank which provides for sufficient wall contact for transfer of frictional forces, and which provides for the absence of air or vapour within the tank, and in view of the additional pressure which could occur in the liquid during forceful acceleration or deceleration of the tank, and because of the necessary non-deformability and non-elasticity of the tank, the upper plate of the tank must be connected (welded) to the other walls of the fuel tank. The upper plate must be able to transfer forces on, or to absorb forces from, the other tank construction. As an example: A holder or bucket, 100% filled with a liquid provided with a non-deformable, non-elastic cover which, however, due to the shape and dimensions, can not be clamped upon the bucket but is hanging over the edge of the holder or bucket, loses its cover in a dynamic situation by the forces that the liquid exerts on this cover.

The most important properties of a closed (steel) tank are:—which tank can be unlimited accelerated or decelerated without loss of stability—being filled for 100% with liquid—so without air or vaporized liquid or components thereof or other gas—; and being filled with a small overpressure; and the walls being designed and made of a non-elastic material on the basis of a non-deformable construction in which all the parts of the tank can unlimited transfer forces onto each other.

Note an exception to this is the 0% liquid filling.

In practice, mobile liquid holders or tanks are not always, even seldom if ever, 100% full, so there will be air or vapour in the liquid tank (being part of the transport means) resulting in loss of stability of the transport means due to occurrence of turbulence and movement (sloshing). Due to the thermal expansion of a liquid when increasing the temperature, for example, a tank is often filled up to a maximum of 96 or 98%. It is well known in the distribution of liquids that a transport means containing liquid may have more than one unloading address, or that having production on various locations results in more than one loading address, so that between the addresses the truck is often driven having a partial liquid load. Customers can also order from the suppliers of the holder or tank a different volume than the fixed volume of liquid in a transport vehicle such as a tanker (tank ship), tank railway wagon, tank container or tank truck or alternatively a tank may only be partially filled because of legal restrictions e.g. with respect to the maximum allowed total weight of a transport means.

Known in the art is a cylinder with piston and piston rod in which the space below the piston is variable, which piston may be positioned such that the liquid present in the piston fills 100% said space under the piston (possibly also with a slight overpressure). The piston is shape-retaining (rigid) and therefore can be formed in the same shape and size as the liquid surface, which is constant at each volume. The piston is also non-elastic and can transfer forces onto the cylinder by means of the piston rod that is fixedly connected to the piston. The cylinder has a constant diameter over the entire range of the piston. This technology is therefore not applicable for preventing dynamic behaviour of liquids in mobile holders. Mobile holders or tanks seldom have a vertically permanently constant surface, in trucks and rail wagons liquids are almost exclusively transported in horizontal cylinders. They are also seldom round but generally oval, sometimes moreover having different radii of curvature from front to rear etc. In case of tanks in ships more often rectangular and chamfered surfaces are found, so that the liquid surface never has a constant shape and dimensions and permanently must be protected against dynamic turbulent behaviour. The outside and above the cylinder protruding piston rod also causes unworkable situations when identically applied in the holder or tank of a transport vehicle, for example because of the height of the projecting piston rod.

Also known in the art are bulkheads and partitions that can be permanently provided in a mobile liquid holder or tank for the purpose of reducing the dynamic behaviour of liquids and reducing the impact on the stability and driving behaviour of the transport means. These baffles or walls are provided transverse to the driving direction of the transport means and thus transverse to the longitudinal axis of the liquid holder. As a result they have only a limiting effect on the liquid movement in the driving direction of the transport means, and not on other liquid movements in other directions, in particular not on liquid movement in lateral directions. These baffles or partition walls achieve a reducing effect on wave motions of the liquid by subdividing a large volume of the liquid into several smaller volumes and consequently the space for movement for these smaller volumes becomes limited between the partitions or walls, compared to the large total space of the holder. It is important, however, that partition walls and baffles provide additional opportunities for the transfer of forces (energy) of the liquid onto the tank wall and vice versa. Baffles and partition walls are always constructed from non-deformable, non-elastic metal (usually stainless steel) plates, identical to the (exterior) walls of the liquid holder or tank, which is required due to the still occurring turbulence of the liquid in the holder.

It is therefore an object of the present invention to provide a device or element for a liquid holder or tank of any shape or size, suitable for application in holders or tanks for the transport of liquids, so that this device, even when the liquid is not 100% filling the liquid holder or tank, prevents any form of liquid turbulence or dynamics, and consequently the stability of the liquid transport means can be maintained identical to a 100% liquid-filled non-elastic non-deformable closed tank with slight overpressure or identical to the stability of a means of transport having a fixed loading, which jointly move by means of cargo safety products such as straps.

This object of the invention is achieved by providing an inflatable element for use in the interior of a liquid holder, wherein the element comprises one or more chambers, and the walls of the chambers are formed of a flexible, deformable, nearly non-elastic, air-impervious material, wherein the first chamber is filled with inflation medium from a non-filled, shape-less starting position, whereby the volume of the first chamber increases nearly pressureless to a point where a further increase in volume of the first chamber is only limited possible due to a rapidly increasing pressure rise in the first chamber, and wherein the first chamber covers the entire liquid surface in the liquid holder at a filling of the first chamber with inflation fluid up to the volume in which a slight overpressure is created having a range of 5 to 200 millibar.

More particularly, the present invention relates to an inflatable element, which is not deformable by the liquid in a vertical direction, in which the element at any liquid level and at any volume of liquid at least covers the whole horizontal liquid surface when the element is positioned in a non-deformable, non-elastic liquid holder or tank, and for that purpose the element can change both in size and in shape when this is necessary because of the geometry, the shape or dimensions of the liquid holder or tank. For this purpose the patent provides three variants of such elements.

In the "fixed volume" type the element to be inserted into a mobile liquid holder or tank consists entirety of a non-elastic plastic bag which, apart from an air connector, is completely closed and made of a material having a low (no) permeability. When this plastic bag is not filled with air, it can be introduced into the tank through a normal "manhole" facility. After positioning into the tank, this plastic bag is subsequently filled with air. Firstly the pressure in the bag will not increase because the volume increases. This will continue until the point of the design volume of the bag is reached and from there the pressure will increase more quickly due to the non-elasticity of the material. Further increasing the air pressure by adding more air (or another inflating gas) is not necessary because at this point the plastic bag has become sufficiently dimensionally stable. A non-elastic plastic bag may be made from a non-elastic plastic material or from an elastic plastic material on which a non-elastic carrier is provided. In particular the latter will be applied when the use of standard elastic plastic is preferred due to its chemical resistance. The element is also provided and made having a geometry that is identical to the shape of the liquid holder and in the inflated state is provided with somewhat smaller dimensions (0.1 to 2% smaller) than the holder.

The aggregate (sum) of the volume of the plastic bag completely filled with air (or inflating gas) and the volume of the liquid is exactly equal to the volume of the liquid holder. The plastic bag filled with the air (or inflating gas) has with its entire exterior surface maximum contact with the liquid holder and with the liquid, thereby with its entire surface providing force transfer between the liquid and the liquid holder.

In a preferred embodiment, the portions of the wall of the second chamber are in contact with the interior side of the wall of the liquid holder, and also with all the portions of the wall of the first chamber that are neither in contact with the liquid nor with the interior wall of the liquid holder.

Preferably, the element is made from a material that is chemically resistant to the liquid in the holder and that is not or hardly permeable.

In particular, the material from which the first and/or the second chamber of the element is made, has a modulus of elasticity (E) of at least 250 MPa.

More in particular, the modulus of elasticity of the material of the first chamber, which often consists of a non-elastic textile or polyamide support having coated thereupon an airtight and fluid-tight thermoplastic single-sided or double-sided coating that is chemically resistant to the liquid contained in the holder in which the inflatable element can be placed, is much higher than that of the conventional inflatable balloon-shaped products, which are in the order of 1 MPa.

In a preferred embodiment the first chamber consists of more than one partial chamber, or consists of various compartments, in such a way that the liquid surface is completely covered by one or more partial chambers or compartments of the first chamber, when this surface in size and/or shape depends on the degree of filling of the liquid holder, or differs in size and/or shape over the entire range of liquid levels that can occur in the holder at any time.

In particular, the second chamber consists of more than one partial chamber, or of various compartments, in such a way that the portion of the interior wall of the liquid holder, which is not covered by the first chamber and not by the liquid, at any time completely is covered by one or more partial chambers or compartments of the second chamber.

Preferred is the embodiment wherein the first and/or second chamber is interiorly provided with wire connections between the top wall and the bottom wall.

In particular, the first and/or second chamber is provided with point or line contacts between the top wall and the bottom wall.

Preferably the chambers are mutually interconnected, wherein preferably the first chamber is a central channel that is in fluid communication with the second chamber, wherein in particular the second chamber is configured from partial chambers, each being in fluid communication with the central channel.

More in particular, the element comprises a permanent or temporary pneumatic device for application/use within the interior of a holder that is filled with a liquid for less than 100%, wherein the element comprises on the contact-surface with the liquid at least, and at all times, rigid (shape-retaining) arcs of a non-elastic material, the element comprising such a volume that together with the volume of liquid, it is equal to the volume of the holder, and wherein the element ensures that the liquid cannot move or accelerate relative to the holder.

More in particular additional features are provided for changing the contact properties with the wall of the holder, and wherein these features can increase or decrease the contact-surface, and can increase or reduced the force transfer.

More in particular additional features are provided for the removal of any possible air, vapour or other gas located below the element or above the liquid; the features being arranged as an optionally compressible tube or shape-retaining pipe or as roughness of surface irregularities of the exterior wall of the element.

The embodiment is advantageous wherein permanent or temporary means are provided for the addition or extraction of air or other filling gas, in order to maintain the required operating pressure within the element or to compensate for changes in the liquid volume within the holder so that the sum of the volumes of the element and the liquid in the holder remain equal to the volume of the holder. The shape of one or more partial chambers of the element changes to such extent under high force load that the spherical shape of the wall of the element or the liquid surface is entirely vertically displaced, and that the volume of, and the pressure in, the partial chamber remains nearly constant by a simultaneous deformation of said wall portions, which separate the interior chamber from the adjacent chamber(s).

In particular the second chamber of the element comprises wall portions, one or more element or chamber wall portions, which are not in contact with the liquid, which are not shape-retaining and/or could exhibit elastic behaviour and/or have additional material, in such a way that a change in volume of the element can be accomplished.

The invention will be hereinafter in detail further explained by means of a drawing containing a few exemplary embodiments of the inflatable element, whereby features and other advantages will come forward.

FIG. 10B is a side view of the liquid holder of FIG. 10a.

FIG. 10C is a perspective view of the liquid holder of FIG. 10a.

Figure 1A:
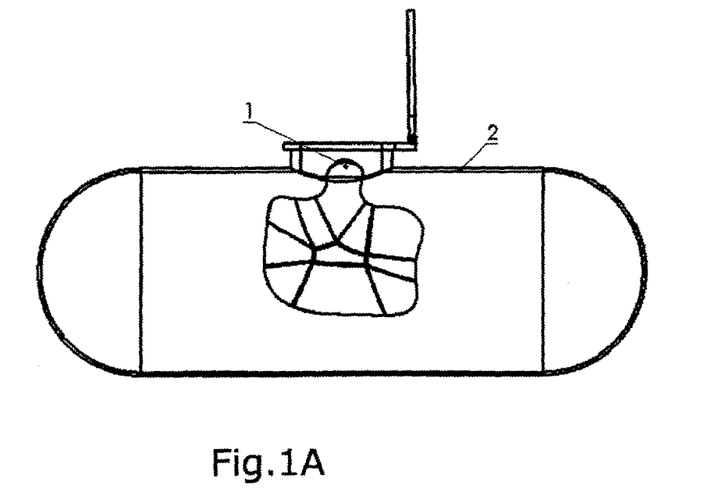
FIG. 1A shows a cross-sectional side view of a liquid holder (2) with a not fully inflated inflatable element (1) inside.
Figure 1B:
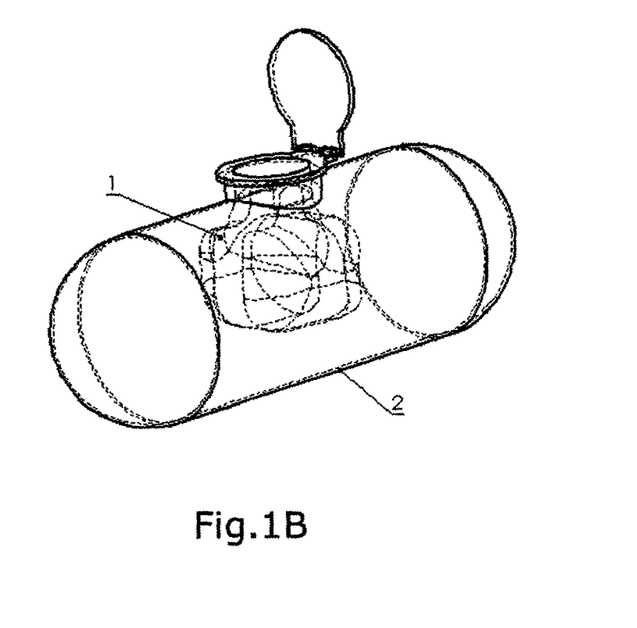
FIG. 1B shows a isometric view of a liquid holder (2) with a not fully inflated inflatable element (1) inside.
Figure 2A:
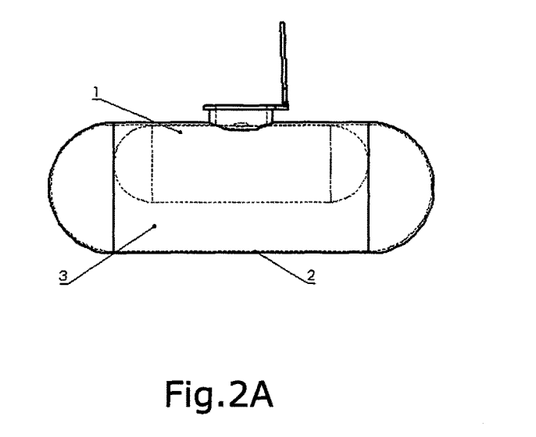
FIG. 2A shows a side view of a liquid holder (2) with a fully inflated inflatable element (1) and liquid (3) inside, where the sum of the volume of the inflatable element and the volume of the liquid can be equal to the volume of the liquid holder.
Figure 2B:
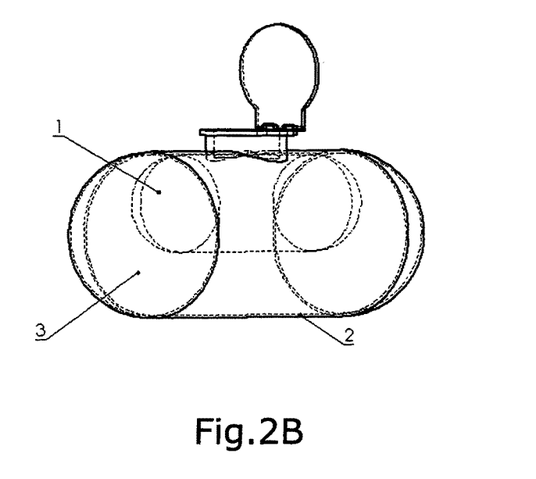
FIG. 2B is a perspective view of the liquid holder of FIG. 2A.
Figure 2C:
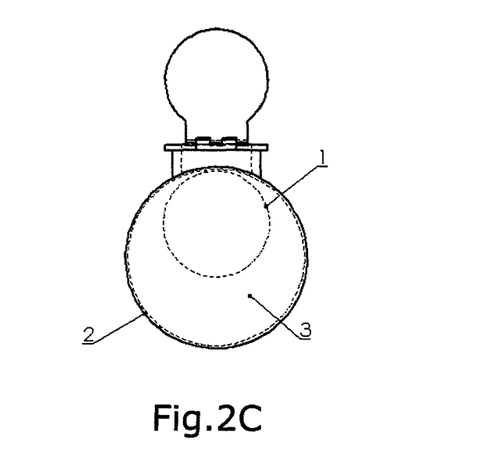
FIG. 2C is a front view of the liquid holder of FIG. 2A.

FIG. 1a (side view) and FIG. 1b (isometric side view) show the insertion of a plastic bag (1) in a horizontal cylindrical liquid holder (2);

FIGS. 2a (side view), 2b (isometric side view) and 2c (front view) show the plastic bag (1) in inflated state in a liquid (3) filled liquid holder (2).

The element in its "mattress" shape, to be inserted into a mobile liquid holder or tank, is also entirety composed of a non-elastic plastic bag, made from a material having a low (no) permeability, which is completely closed, apart from an air connector. The difference with the fixed form is that the fixed partial volume element only forms a relatively thin shape-retaining mattress, which always and at any liquid level covers the entire liquid surface. The generated forces between the liquid holder interior wall and the liquid are transferred via the edges of the mattress and the contact(s) of this edge with the interior wall of the liquid holder. Above the mattress, which is filled with air or another inflating gas, "free" air may be found resulting from the liquid vapour or another gas, which whether or not may have a pressure equal to or greater than the ambient pressure. The space in the tank above the mattress cannot be reached by the liquid, and because of the shape-retaining mattress, which is fixed in its position by the frictional forces, the space is also not available for turbulent behaviour of the liquid.

Contact-surface or the force-transferring enlarging segments can be provided at the edges of the mattress. Also an additional segment may be provided upon the mattress, whether or not connected with or as part of the mattress. This additional segment is intended to improve (enlarge) the force-transfer between the tank wall and the liquid and for pressing onto the liquid by the mattress, among other things to prevent formation of air, vapour or gas under the mattress.

Figure 3A:
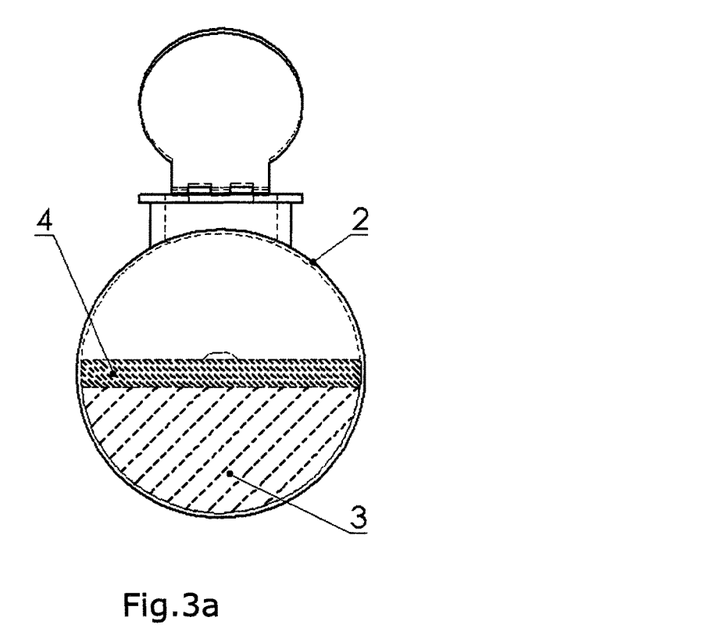
FIG. 3A shows a cross-sectional front view of a liquid holder (2) with an inflated inflatable element (4) and liquid (3) inside, shown with an access hatch in an open position.
Figure 3B:
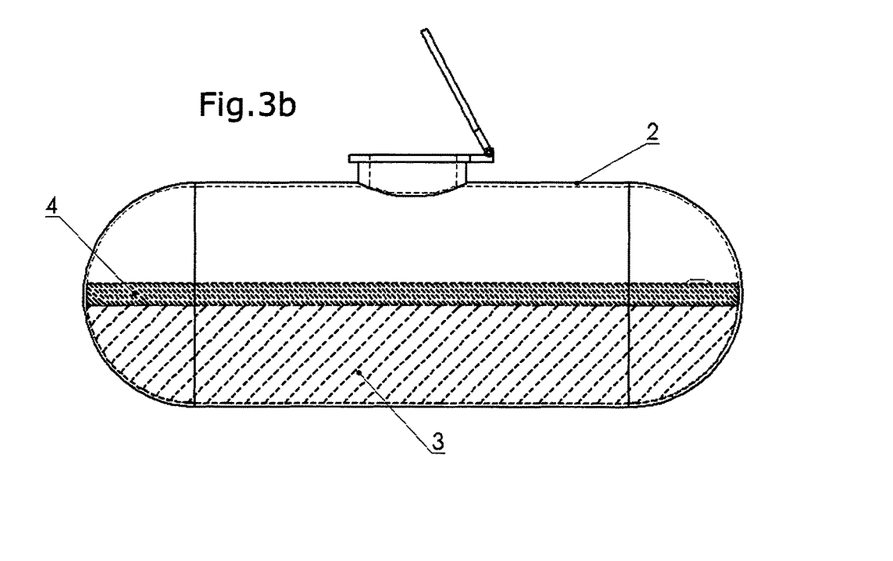
FIG. 3B is a cross-sectional side view of the liquid holder of FIG. 3A.
Figure 3C:
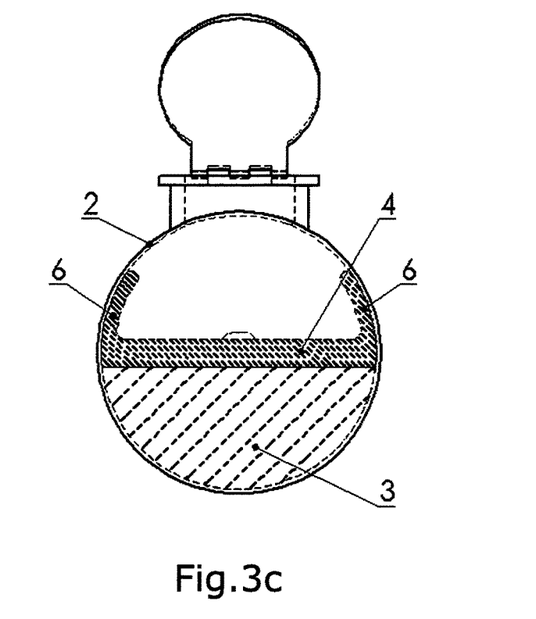
FIG. 3C is a cross-sectional front view of the liquid holder of FIG. 3A, shown at a first liquid level and including force-transferring segments (6) disposed on top of the inflatable element.

FIGS. 3a (front view) and 3b (side view) show a plastic mattress (4) in inflated state in a liquid-filled (3) liquid holder (2) and FIG. 3c shows a plastic mattress (4) in the inflated state, with on the top side of the mattress arranged contact-surface or force-transferring enlarging segments (6) in a liquid-filled (3) liquid holder (2).

Figure 3D:
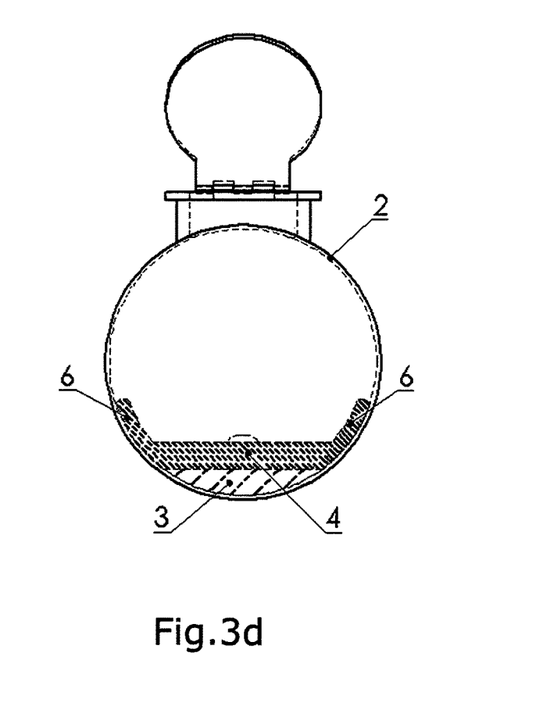
FIG. 3D is a cross-sectional front view of the liquid holder of FIG. 3C, shown at a second liquid level that is lower than the first liquid level.

FIG. 3d shows a liquid holder (2) liquid-filled (3) at a lower level, provided with a similar plastic mattress (4) in the inflated state, having a contact-surface of force-transferring enlarging segments (6) arranged at the top side of the mattress.

An excess of mattress element material that might occur at any level of liquid in the liquid holder, due to changes in shape or dimensions of the holder, can either be located upwards in the air or in the vapour part within the holder, or can be located downwards into the liquid part in the holder or tank. In doing so, a downward displacement of this excess material into the liquid part will result in enhanced pressing forces of the mattress against the holder wall. A displacement upwards towards the air or vapour part may lead to a higher friction coefficient.

Figure 4:
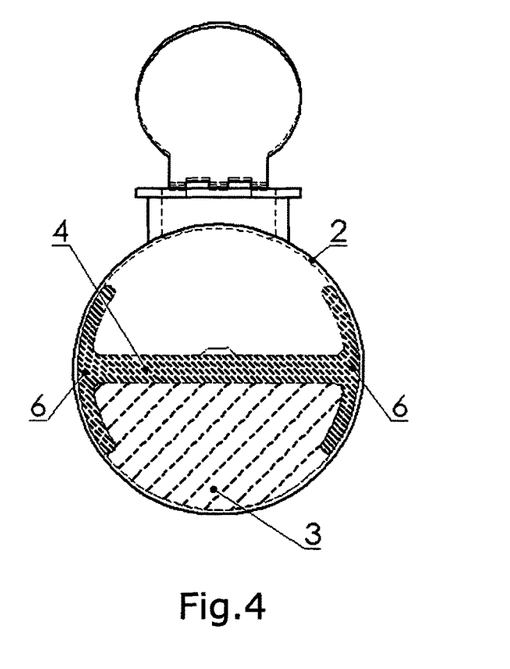
FIG. 4 is a cross-sectional front view of a liquid holder (2) with an inflated inflatable element (4) and liquid (3) inside, including force-transferring segments (6) disposed on top of and beside the inflatable element.

FIG. 4 shows the plastic mattress (4) in the inflated state in the liquid holder (2) and liquid (3) with contact-surface or force-transferring enlarging segments (6) arranged at the edges of the mattress.

Figure 5:
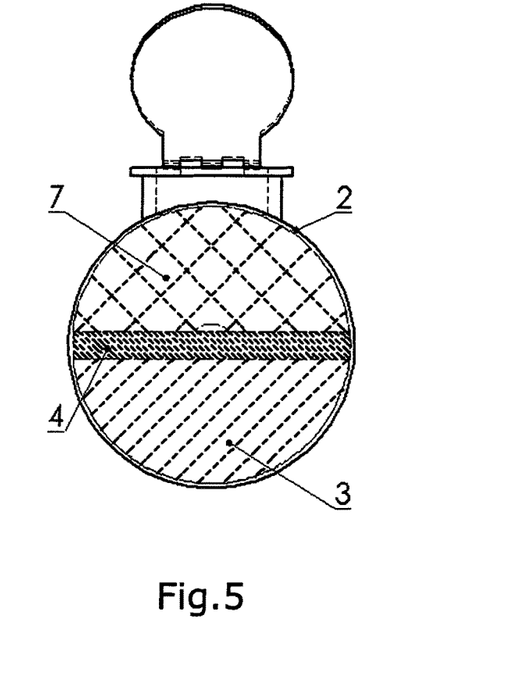
FIG. 5 is a cross-sectional front view of a liquid holder (2) with an inflated inflatable element (4) and liquid (3) inside, including a force-transferring segment (7) disposed on top of the inflatable element.

FIG. 5 shows the plastic mattress (4) in the inflated state in the liquid holder (2) and liquid (3) having an additional segment (7), whether or not being attached to or being part of the mattress.

Figure 6:
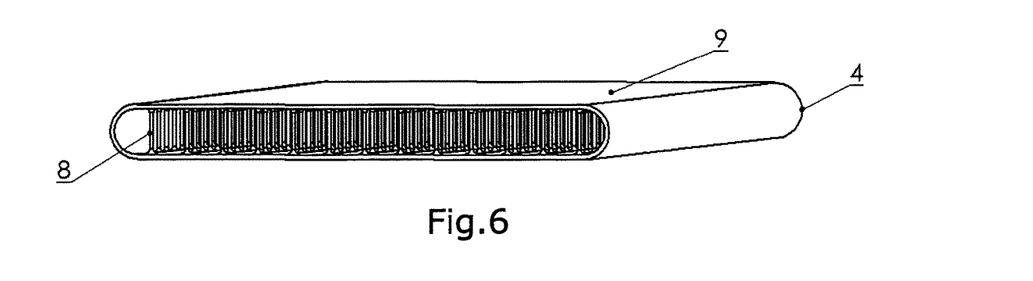
FIG. 6 is a perspective view of an inflatable element (4), including top and bottom air-impermeable layers (9) joined along the circumference of the inflatable element and wires (8) disposed between the top and bottom air-impermeable layers.

The thin flat shape of the mattress having a large surface is inherently not shape-retaining. Hence the shape-retaining (dimensional) stability can be achieved with the following methods:

FIG. 6 shows this by very many inflexible wire connections (8) between the air-impervious bottom and top layer (9) of the mattress (4).

Figure 7:
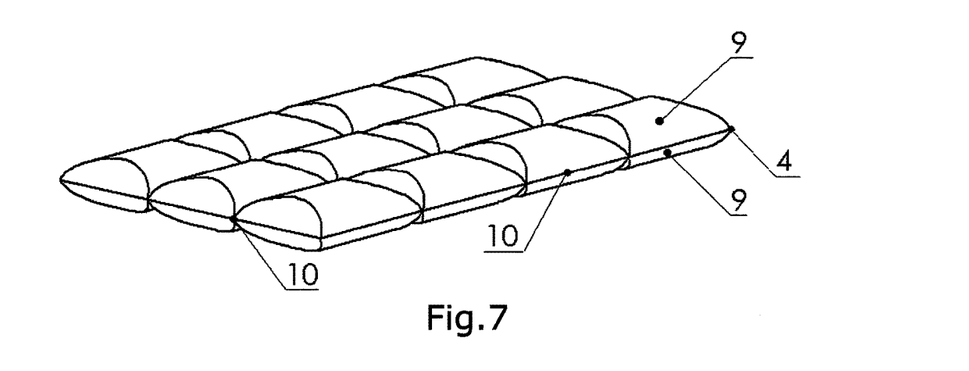
FIG. 7 is a perspective view of an inflatable element (4), including top and bottom air-impermeable layers (9) that are joined to one another at points or along lines.

FIG. 7 shows this by many form-closed or force-closed point or line connections (10) between the air-impervious bottom and top layer (9) of the mattress (4).

Figure 8:
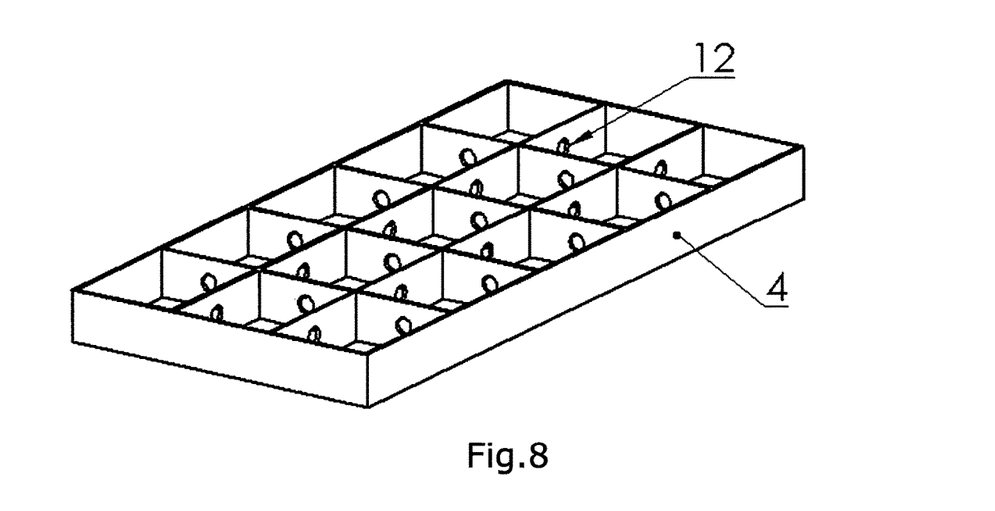
FIG. 8 is a perspective view of a portion of an inflatable element (4), including chambers in fluid communication with one another via connections (12).

FIG. 8 shows this by chamber-forming inside the mattress (4) with air or other inflatable gas flow connections (12) between the internal chambers of the mattress.

The "variable volume" type of the element to be inserted into a mobile liquid holder or tank is comprised entirety from a non-elastic plastic bag, being made of a material having a low (no) permeability, which is completely closed, apart from an air connector. The total sum of the volume of an element of the "variable-volume type" and the volume of the liquid contained in the liquid holder is any time identical to the total volume of the liquid holder. The major difference with the fixed volume type is that the volume of the liquid is allowed to vary because the volume of the variable volume element increases or decreases inversely proportional so that the sum of both volumes remains identical to the total volume of the liquid holder. Thereby the working range of the volume of the variable volume element may optionally be limited to a part of the total volume of the liquid holder, for example 10-96%, because there will never be less than 10% of liquid filling in the liquid holder to be transported, and due to thermal expansion, there will never be more than 96% of liquid filling in the liquid holder.

The element of the variable volume type is designed having interior or partial chambers, which are mutually interconnected by means of openings so that air or any other inflating gas can flow from one chamber to another chamber in communication therewith.

Figure 9A:
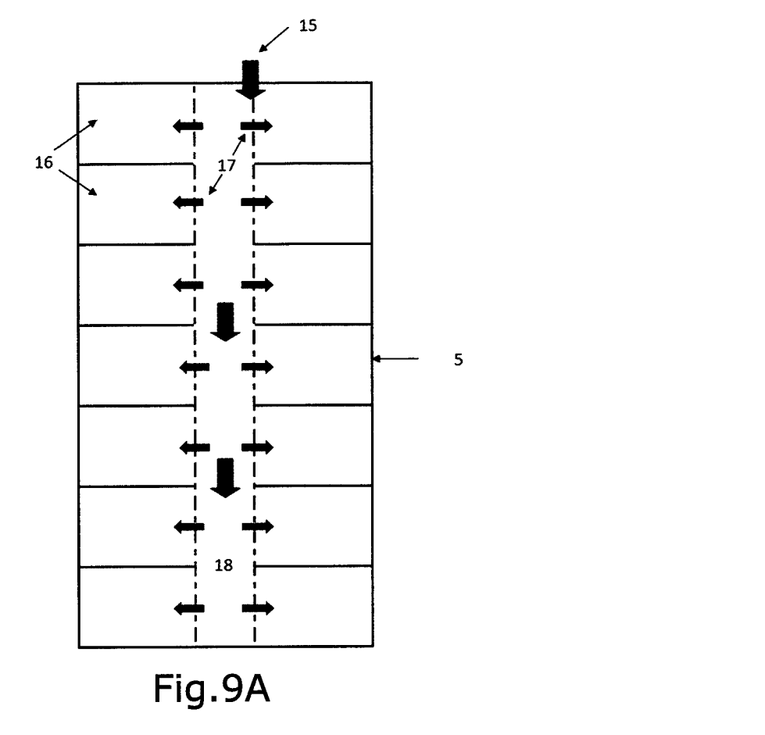
FIG. 9A is a top schematic view of an inflatable element (5), including top and bottom air-impermeable layers that are joined to one another to form chambers (16) in fluid communication with a central channel (18).

FIG. 9a shows, in top view, a variable volume mattress (5) in non-inflated state, i.e. without liquid holder, consisting of two identical non-elastic air- or gas-tight plastic layers connected to each other at the location of the drawn lines, for example by ultrasonic welding or gluing. FIG. 9a shows an air or inflating gas supply and discharge means (15) and internal air or inflating gas flow means between and in the interior i.e. partial chambers (16) via the openings (17), wherein an optional central channel (18) sufficiently and rapidly ensures displacement of the air or inflating gas.

Figure 9B:
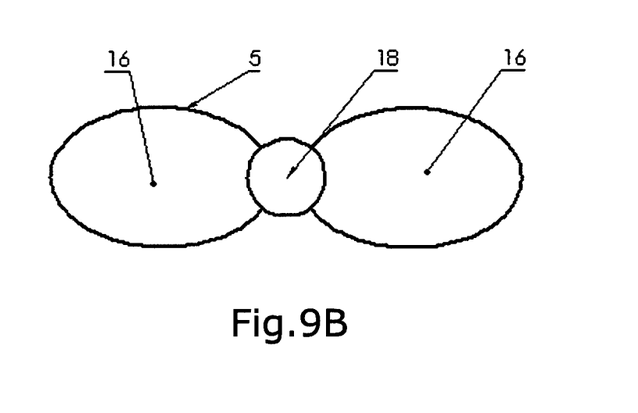
FIG. 9B is a cross-sectional front view of the inflatable element of FIG. 9a, shown in an inflated state.

FIG. 9b shows the front view of the variable volume mattress (5) as shown in FIG. 9a however now in an air-inflated or inflating gas-filled state, outside the liquid holder having a first chamber in other words a central channel (18) and two second channels (16).

These interior i.e. partial chambers of a variable volume element are the most important difference between the design of an inflatable element of the type having a fixed volume and the type having a variable volume.

Figure 10A:
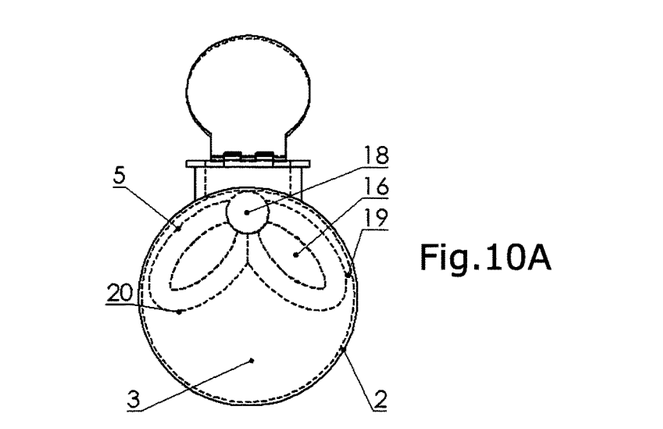
FIG. 10A shows a cross-sectional front view of a liquid holder (2) having the inflatable element of FIG. 9a (shown in inflated and deflated states) and liquid (3) inside.

FIG. 10a (front view) shows an inflatable element according to the invention formed by a variable volume mattress (5) as shown in FIG. 9b however here in a partially inflated state by means of air or inflating gas, in a with liquid (3) filled horizontal cylindrical liquid holder (2). The side, or in other words, partial chambers (16) are filled with inflating gas from the central chamber (18) being in communication with the partial chambers. Due to the upward force of the liquid, the wall of the central chamber will be pressed against the liquid holder. In addition, the chamber walls are located (19) on the interior wall of the liquid holder (2) wherein the material of the inflatable element, which is not used for obtaining the volume, is also pressed onto the wall while taking the form of folds. The chamber walls provide "arcs" (20) on the liquid contact-surface.

Figure 10B:
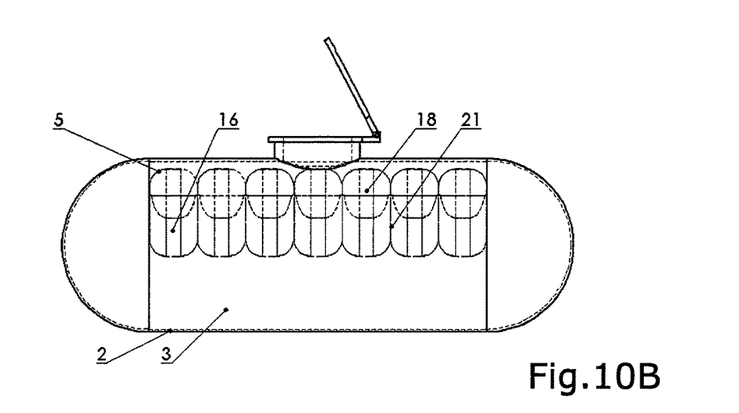

FIG. 10B (side view) shows the same variable volume mattress (5) as shown in FIG. 10a, in a horizontal cylindrical liquid holder (2) filled with liquid (3), with walls (21) to form a partition between the second chambers (s) of different side chambers or partial chambers (16).

Figure 10C:
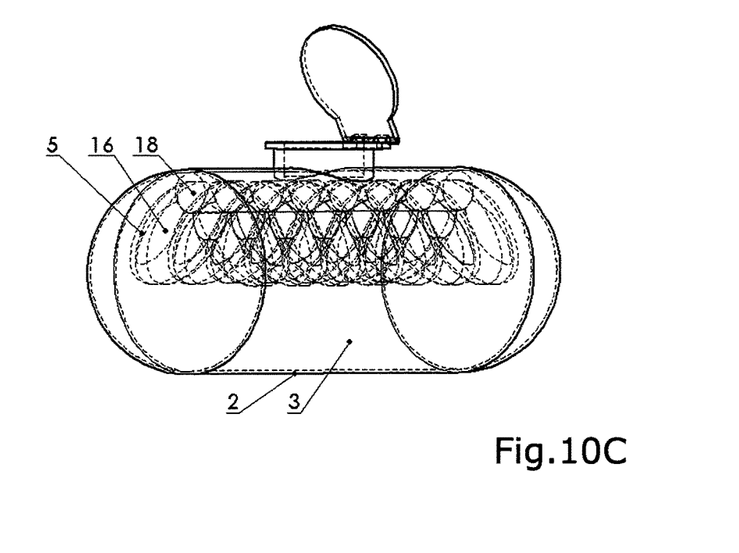

FIG. 10c shows in an isometric view a similar variable volume mattress (5) as shown in FIG. 10a in a horizontal cylindrical holder (2) filled with liquid (3).

The function and the method of each wall portion of a variable volume inflatable element are dependent on the above-mentioned position, which it occupies at any moment.

Where the variable volume element is in contact with the liquid, the wall of the inflatable element and of the chamber becomes convex, i.e. spherical, and the liquid surface will be concavely depressed, due to the small excess pressure of the air or the inflating gas within the element. The length and width of the interior or partial chambers, which mutually may vary in design and construction, determine the radius of curvature (/radii) of the formed sphere or arc. These radii of curvature may be variable, depending on the liquid level and the shape of the tank. The total length and width of a variable volume element are designed and constructed such that the variable volume element at any liquid level in the holder covers the liquid surface with a volume filled with air or inflating gas, that added together with the liquid volume, at that moment contained in the liquid holder, equals the volume of the holder. The convex shape of the variable volume element, where there is contact with the liquid in the holder, has a high degree of rigidity (non-deformability), in particular relative to the deformability of the wall parts of the element and/or the chambers, which form a partition between two interior chambers or partial chambers.

The convex shape of the wall portion of a variable volume element at the location of contact with the liquid in the holder also ensures that the element can transfer forces onto the liquid and vice versa. The stiffness and shape-retention of the arc at the location of contact with the liquid surface is enhanced by the use of non- or less elastic materials, by a greater wall thickness of the material or by a feature like previously described with the mattress-type, or by a higher working pressure. For the walls of the inflatable element and/or the chambers preferably materials are applied having a modulus of elasticity of greater than 250 MPa.

Where the variable volume element is in contact with the interior wall of the holder, the wall of the element ensures transfer of forces between the interior wall of the holder and the element. It is important that the wall element itself, at the location where it abuts on the interior wall of the holder, will not displace with respect to the holder wall, not even at changing speeds or accelerations of the holder. As a result these wall portions of the variable volume element, which are positioned at the holder wall, provide basic support for the arc, for the spherical shaping of the wall portion of the element and/or for the (partial) chamber that is in contact with the liquid.

In the third option for the position of the wall of the variable volume element, this wall constitutes a partition between two interior chambers or in other words partial chambers. This portion of the element wall has the highest degree of deformability relative to the other wall portions. The deformability of these wall portions increases at greater distance of the holder wall.

Forming "arcs" on the variable volume element at the location of contact with the liquid surface has a limiting effect on the scope of turbulence of the liquid in the holder. Due to the radii of curvature of the liquid, caused by the arcs, any liquid portion in the liquid surface will have a different preferred initial direction of movement and each volume portion having an identical movement preference will have a different mass. The variable volume element will experience thus randomly distributed local loads from the arc-shaped contact-surface, which level out over the total contact-surface in such a way that the stiffness and shape-retention of the variable volume element amply provides resistance to a possibly remaining vertical load component which could result from the liquid.

In this respect reference is being made to the well known variations in the art of the bridge construction whereby a span in between two banks or between two mountains can be realized with one span (identical to how a fixed volume element forms an arc on the liquid contact-surface) or with a bridge having several arches resting on pillars, which are all built up from the river valley located below the span.

Furthermore in relation thereto is referred to the wave and vibration theories, with which a wave motion easily is introduced on a flat plane (or straight line, as a derivative thereof); however much less pronounced manifested, or not, on a non-flat surface.

Figure 11:
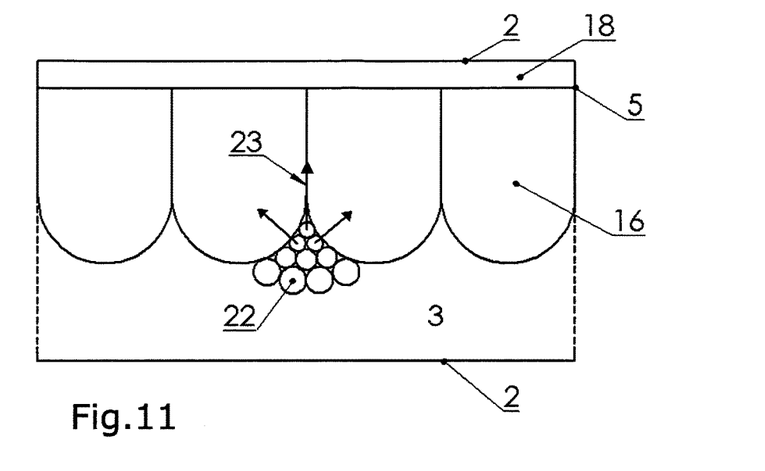
FIG. 11 is a schematic side view of the liquid holder of FIG. 10a, illustrating contact between the inflatable element and the liquid.

FIG. 11 shows the contact between a convex wall of the inflatable element of a second chamber or partial chamber (16) of a variable volume mattress (5) in a liquid holder (2) filled with a liquid (3), wherein the variable volume mattress is connected to the first, or in other words, central chamber (18). At the surface the liquid consists of different mass parts (22) having several preferred displacement directions (23).

It is essential for the function of an element of the variable volume type that also relatively small pressure differences may briefly arise between the different (first and/or second) chambers of the element. During heavy braking or slowing down of a mobile liquid holder the chamber, or the (first and/or second) chambers, of the variable volume element which is closest to the front portion of the holder experiences a higher pressure on the arc-shaped contact-surface than the further rearwards positioned chambers. This causes that the arc(s) of the second chamber, without deformation, are being pushed upwards to a limited extent. The volume reduction that should have arisen in the relevant chamber (s) is compensated, because the walls, when they have a greater distance to the wall or the liquid contact lines, bend out in the direction in which the pressure decreases (in this example backwards).

Figure 12A:
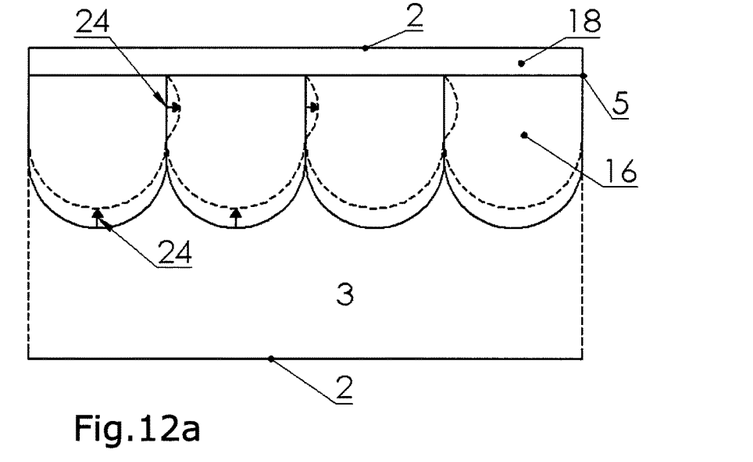
FIGS. 12A and 12B are schematic side and top views, respectively, of the liquid holder of FIG. 10a, illustrating deformation (24) of the inflatable element due forces between the inflatable element and the liquid.
Figure 12B:
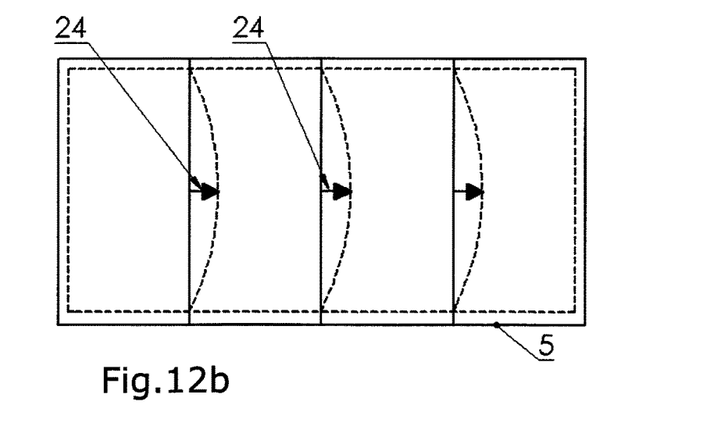

FIGS. 12a (side view) and 12b (top view) show the change in shape of a side chamber or partial chamber (16) when the spherical or arc-shaped wall portion of the element, being in contact with the liquid (3), is pressed inwardly (24). These changes in shape arise as a result of big accelerations, which cannot entirely be transferred through the walls of the element and may lead to a local pressure increase in the liquid. Here the side chambers i.e. partial chambers (16) and the central (first) chamber (18) are forming the variable volume mattress (5), which is positioned in a liquid holder (2) filled with liquid (3).

In this context we would like to mention the—in the relevant art—well-known "bubble" plastic in which solid products are packaged, each bubble in itself being deformable; however the whole of bubbles keeps the product on its place.

Elements of all the above-mentioned types may be provided with a component, whether or not connected to the element or being an integral shaped part thereof, so that any air or vapour or other gas, which could be located under the element or above the liquid surface, may escape. This component can be a hose from the bottom side to the topside of the element, but may also be a perforated tube positioned in the liquid. Also the element may be provided with a sharp unevenness i.e. roughness on a limited part of the circumference, for example, a knotted net that is affixed on the exterior wall of the element or is incorporated into the wall, so that the element is lying onto the interior wall of the liquid holder, while locally not blocking air or gas. These components may also serve to prevent any risk of a pressure build-up in the liquid under the element, wherein the element may constitute an obstacle for the functioning of the overpressure protection (-s) arranged on the liquid holder.

Elements of identical description as above can be applied when the liquid is contained in a flexible container in the liquid holder. Such a flexible container could be used, for example, because of hygiene requirements for the liquid or because of avoiding the necessity of cleaning the liquid holder after unloading or removal of the liquid. In the economic preferred embodiment a flexible liquid container is thin walled, and is not resistant to the dynamic behaviour of the liquid in a mobile situation. The addition of an element of the above-mentioned shape and description would eliminate undesirable dynamic behaviour for each of the flexible liquid containers.

The supply of air or other gas is performed on the basis of pneumatic systems, which can be assembled on the basis of components well known in the industry, which systems both can maintain a desired pressure as well can supply or remove air or other gas to or from the element.

The elements may, regardless of their shape, either be attached to the liquid holder or not being attached, and thereby will eliminate the dynamic behaviour of the liquid without being influenced by this liquid. In a preferred embodiment the element is not attached onto the holder. Attaching may be preferred due to other reasons than liquid stability, e.g. for cleaning or loading the holder.

The invention claimed is:

1. An inflatable element for use in the interior of a liquid holder, wherein:
the element comprises one or more chambers, and the walls of the one or more chambers are formed of a flexible, deformable, nearly non-elastic, and air-impervious material,
a first chamber of the one or more chambers is configured such that:
when the first chamber is filled with inflation fluid from a nonfilled, shape-less starting position, the volume of the first chamber increases substantially without an increase in internal pressure to a threshold volume at which a further increase in the volume of the first chamber is limited by a rapid increase in internal pressure in the first chamber, and
when the element and liquid are disposed within the liquid holder and the internal pressure of the first chamber is between 5 and 200 millibar, the first chamber overlies the entire liquid surface in the liquid holder, and
at least one of the one or more chambers interiorly is provided with wire connections between a top wall of the chamber and a bottom wall of the chamber.

2. The inflatable element of claim 1, wherein the first chamber comprises two or more subchambers.

3. The inflatable element of claim 1, wherein:
the one or more chambers comprises a second chamber connected to the first chamber and including two or more subchambers, and
the second chamber is configured such that, when the element and the liquid are disposed within the liquid holder and the first and second chambers are inflated, a portion of the interior wall of the liquid holder, which is covered by neither the first chamber nor the liquid, is covered by one or more of the subchambers of the second chamber.

4. The inflatable element of claim 1, wherein:
the one or more chambers comprises a second chamber connected to the first chamber and including two or more subchambers, and
the first chamber comprises a central channel that is in fluid communication with each of the subchambers of the second chamber.

5. The inflatable element of claim 1, wherein:
the one or more chambers comprises a second chamber connected to the first chamber and including two or more subchambers, and
when the first and second chambers are inflated, the first chamber has an oblong shape, which extends in a longitudinal direction, and each of the subchambers of the second chamber has a shape that includes an arcuate surface extending away from the first chamber in a lateral direction.

* * * * *